US009495822B2

(12) United States Patent
McNinch (10) Patent No.: US 9,495,822 B2
(45) Date of Patent: Nov. 15, 2016

(54) RETAIL FUELING ENVIRONMENT UTILIZING POWERED COMMUNICATION OVER LEGACY CABLING

(71) Applicant: Gilbarco Inc., Greensboro, NC (US)

(72) Inventor: Wayne McNinch, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 115 days.

(21) Appl. No.: 14/057,344

(22) Filed: Oct. 18, 2013

(65) Prior Publication Data

US 2014/0114473 A1    Apr. 24, 2014

Related U.S. Application Data

(60) Provisional application No. 61/717,874, filed on Oct. 24, 2012.

(51) Int. Cl.
*G07F 11/00* (2006.01)
*B67D 7/06* (2010.01)
(Continued)

(52) U.S. Cl.
CPC .............. *G07F 11/002* (2013.01); *B67D 7/06* (2013.01); *G06F 1/26* (2013.01); *G06F 21/30* (2013.01); *H02J 7/345* (2013.01); *H04L 67/12* (2013.01); *G07F 13/025* (2013.01)

(58) Field of Classification Search
CPC .......... G07F 11/002; G07F 9/02; G07F 1/26; H02J 9/00; H02J 7/345; H02J 67/12
See application file for complete search history.

(56) References Cited

U.S. PATENT DOCUMENTS 3,931,497 A    1/1976   Gentile et al.
5,797,470 A    8/1998   Bohnert et al.
(Continued)

FOREIGN PATENT DOCUMENTS

CN    102006339 A    4/2011
EP    0984612 A1    3/2000
(Continued)

OTHER PUBLICATIONS

International Search Report and Written Opinion mailed Feb. 1, 2013 of PCT/US12/65673, all enclosed pages cited.
(Continued)

*Primary Examiner* — Aristocratis Fotakis
(74) *Attorney, Agent, or Firm* — Nelson Mullins Riley & Scarborough, LLP (57) ABSTRACT

Various systems and methods are provided for facilitating powered communications over legacy cabling. This can be implemented in a fuel dispensing environment where the fuel dispenser can include a diode coupler communicatively coupled to the legacy cabling for receiving powered communications from one or more backroom components over the legacy cabling during a power outage, and a broadband communications modem for communicating with the one or more backroom components, wherein the diode coupler provides power from the powered communications to the broadband communications modem. Relays can be used at the fuel dispenser and/or backroom components to determine whether to use the powered communications or legacy communications based on whether power is available at the components communicating over the legacy cabling. In addition, failsafe protection of legacy communication circuits is provided when powered communications are active.

14 Claims, 5 Drawing Sheets

(51) Int. Cl.
*G06F 1/26* (2006.01)
*H02J 7/34* (2006.01)
*H04L 29/08* (2006.01)
*G06F 21/30* (2013.01)
*G07F 13/02* (2006.01)

(56) References Cited

U.S. PATENT DOCUMENTS

| | | |
|---|---|---|
| 5,875,037 A | 2/1999 | Murata et al. |
| 6,442,448 B1 | 8/2002 | Finley et al. |
| 6,801,835 B2 | 10/2004 | Covington et al. |
| 2003/0200008 A1 | 10/2003 | Wilson |
| 2006/0209857 A1* | 9/2006 | Hicks, III ............... 370/401 |
| 2007/0152628 A1 | 7/2007 | Lee |
| 2007/0278860 A1* | 12/2007 | Krieger et al. ............ 307/64 |
| 2008/0114999 A1 | 5/2008 | Terry et al. |
| 2008/0259841 A1 | 10/2008 | Deshpande |
| 2009/0004024 A1* | 1/2009 | Durham et al. ............ 417/2 |
| 2009/0045925 A1* | 2/2009 | Demin et al. ......... 340/310.11 |
| 2009/0102618 A1* | 4/2009 | Iwai .................. 340/310.11 |
| 2009/0129403 A1 | 5/2009 | Harrell et al. |
| 2010/0268612 A1 | 10/2010 | Berrio et al. |
| 2010/0327766 A1 | 12/2010 | Recker et al. |
| 2011/0022223 A1* | 1/2011 | Johnson et al. ........... 700/232 |
| 2011/0302432 A1 | 12/2011 | Harris et al. |
| 2012/0226920 A1* | 9/2012 | Strumpf .......... H04L 63/0254 713/300 |
| 2012/0261988 A1 | 10/2012 | Byrne et al. |
| 2013/0121428 A1 | 5/2013 | Carapelli et al. |

FOREIGN PATENT DOCUMENTS

| | | |
|---|---|---|
| EP | 2485405 A1 | 8/2012 |
| IT | 0001353807 | 1/2004 |
| WO | 9845820 A1 | 10/1998 |
| WO | 9934342 A1 | 7/1999 |
| WO | 0075065 A2 | 12/2000 |

OTHER PUBLICATIONS

International Search Report and Written Opinion mailed Jun. 12, 2014 in corresponding International application PCT/US2013/066099, all enclosed pages cited.

First Examination Report issued by Intellectual Property Office of New Zealand in corresponding application No. 708318, all enclosed pages cited.

Extended European Search Report issued on Mar. 11, 2016 in corresponding European Patent application No. 13849819.1, all enclosed pages cited.

* cited by examiner

RETAIL FUELING ENVIRONMENT UTILIZING POWERED COMMUNICATION OVER LEGACY CABLING

CROSS-REFERENCE TO RELATED APPLICATIONS

The present application claims the benefit of U.S. patent application No. 61/717,874, filed Oct. 24, 2012, and entitled "RETAIL FUELING ENVIRONMENT UTILIZING POWERED COMMUNICATION OVER LEGACY CABLING," the disclosure of which is hereby incorporated by reference as if set forth verbatim herein in its entirety and relied upon for all purposes.

TECHNICAL FIELD

The subject matter described herein relates generally to retail fueling environments commonly referred to as service stations. More particularly, subject matter described herein relates to a retail fueling environment in which powered communications are provided over legacy cabling.

BACKGROUND

Fuel dispensing sites typically include one or more fuel dispensers and at least a backroom with one or more components to communicate with the one or more fuel dispensers. The backroom components operate the fuel dispenser to activate dispensing, process consumption data, facilitate video surveillance, perform leak detection, perform valve status detection, or additional operations effectuated by communicating with the fuel dispensers. Fuel dispensing sites typically run power to each fuel dispenser at a forecourt, or at least to a central power source at the forecourt, and the backroom components are powered as well. Power for the backroom components is typically standard alternating current (AC) power with accessible outlets and available branch circuits, such that a backup power source (e.g., uninterruptible power supply (UPS)) can be utilized with the backroom components. Fuel dispensers are typically hardwired, and thus may not have a backup power source, or may have an insufficient backup power source for during at least a portion of a power outage.

Fuel dispensers and backroom components typically communicate via a 2-wire communication protocol, such as currently loop, RS-422/485, or similar protocols. With the development of technology, mechanisms for providing newer protocols and cabling, as well as backup power sources, have been implemented, but require significant construction costs to run new cabling. Wireless protocols can also be used for high-speed communications between the backroom and fuel dispensers, but cannot solve power outage issues. In addition, 2-wire current loop, RS-422/485 or similar communications circuits, are sensitive to direct current (DC) or AC voltages imposed on a communications cable. Thus, application of power over the legacy 2-wire cables can cause damage to related circuitry and/or components receiving communications over the cabling. Additionally, these communications links typically provide 10 kilobits per second (kbps) or less bandwidth, which is not sufficiently large for some desired applications.

SUMMARY

The following presents a simplified summary of one or more aspects of the subject matter disclosed herein to provide a basic understanding thereof. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

Various aspects described herein are directed to facilitating high bandwidth communications over legacy cabling, such as 2-wire cabling, and powering the high bandwidth communications equipment over the legacy cabling. Using communications with combined power over the cabling can allow components on a backup power source to power components for which backup power is not otherwise available during power outages. In addition, aspects described herein can preserve legacy communications among components when power is normally available. In an example, the concepts can be applied to a fuel dispensing environment where one or more backroom components can communicate with one or more fuel dispensers over preexisting 2-wire cabling installed in the forecourt. The backroom components can use a powered communication mechanism to communicate with the one or more fuel dispensers in certain cases (e.g., to obtain mission critical data therefrom during power outage). The powered communications allow the backroom components to power the fuel dispensers during at least part of the power outage to facilitate receiving or transmitting the mission critical data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations may denote like elements, and in which.

DETAILED DESCRIPTION

Reference will now be made in detail to various aspects, one or more examples of which are illustrated in the accompanying drawings. Each example is provided by way of explanation, and not limitation of the aspects. In fact, it will be apparent to those skilled in the art that modifications and variations can be made in the described aspects without departing from the scope or spirit thereof. For instance, features illustrated or described as part of one example may be used on another example to yield a still further example. Thus, it is intended that the described aspects cover such modifications and variations as come within the scope of the appended claims and their equivalents.

Described herein are various aspects relating to providing powered communications between components over legacy cabling to allow communication of critical data in the event of a power outage or other limited power scenarios. The powered communications can be selectively provided to allow legacy communications when full power is available. In one example, a component can detect power outage or other limitation, and can determine to activate powered communications; this can be performed by a control signal input to a dual relay that switches between legacy communications (or other non-powered) communications and powered communications based on the control signal. In a specific example, aspects described herein are employed in a fuel dispensing environment to allow one or more backroom components to obtain critical data from fuel dispensers over legacy 2-wire cabling in a power outage or limited power scenario.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term or is intended to mean an inclusive or rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and an as used in this application document and the appended claims should generally be construed to mean one or more unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
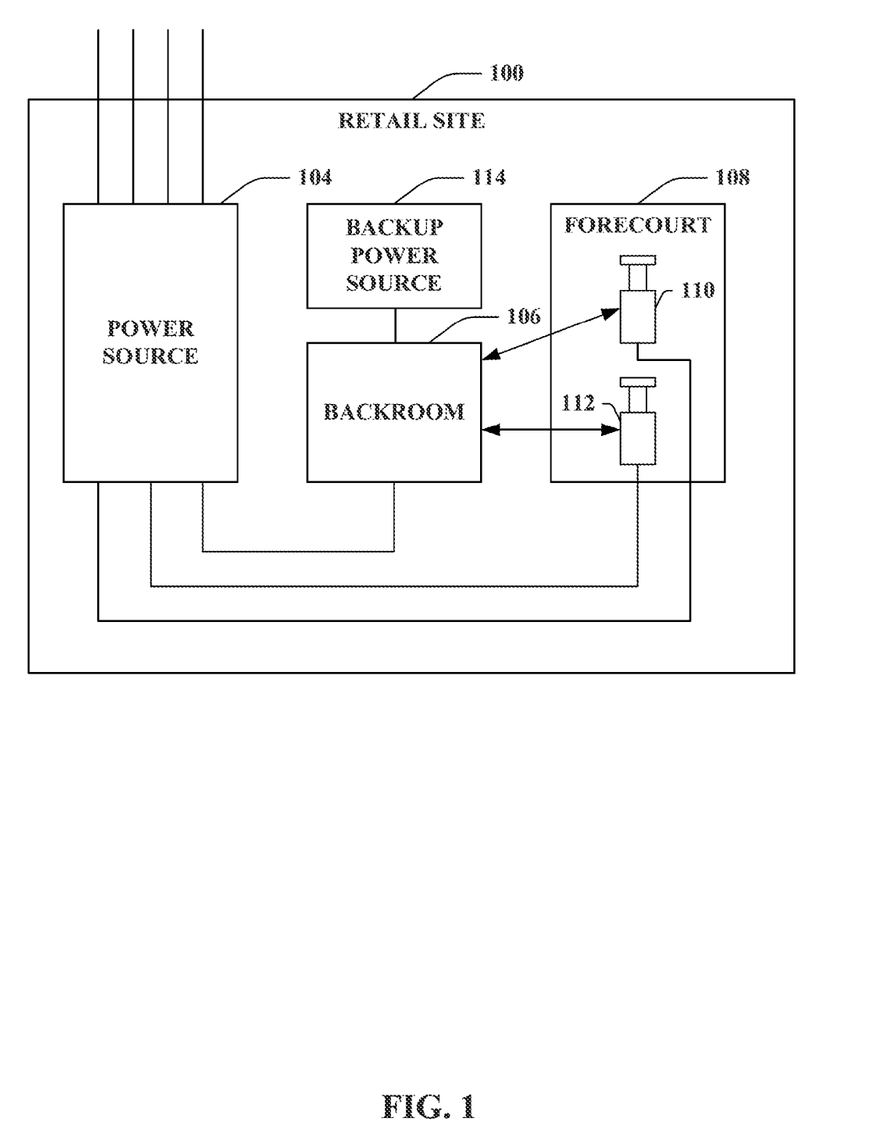
FIG. 1 is an aspect of an example system for powering communications between a backroom and fuel dispensers at a service station.

FIG. 1 illustrates an example retail site 100 in one exemplary application for concepts described herein. Retail site 100 can be a service station for dispensing fuel, in one example, and can include a power source 104 that provides power for various components at the retail site 100, such as a backroom 106, or one or more related components, a forecourt 108, or fuel dispensers 110 and 112 thereof, etc. The power source 104 can be, or can switch, power provided by an electrical grid, a solar or wind-powered source, a backup generator, and/or the like, such as alternating current (AC) power. In one example, backroom 106 can include a backup power source 114 to maintain power in the event of a planned or unplanned power outage or other power limitation at power source 104. This can be a direct current (DC) power source, in one example. In addition, backroom 106, or one or more components thereof, can communicate with the forecourt 108 and/or related fuel dispensers 110 and 112 over a legacy cabling (e.g., 2-wire cabling) and/or using a legacy communication protocol.

In the event of a power outage or other power limitation (e.g., planned or unplanned) at power source 104, backroom 106 can activate powered communications with fuel dispenser 110 and/or 112 over the legacy cabling to communicate critical data therewith. In one example, the backroom 106, which can include various components for communicating with and operating fuel dispensers 110 and 112, can detect the power outage or other limitation, and switch from legacy communications to powered communications over the legacy cabling to facilitate acquisition or provisioning the critical data from/to fuel dispensers 110 and 112. The critical data, also referred to herein as mission critical data, can include pending transaction data, video surveillance data, leak detection data, valve status data, or similar data that should be preserved or communicated even when power is lost. For example, the power from the powered communications can be used to power a modem at the fuel dispensers 110 and 112 for communicating the critical data.

When power is returned via power source 104, backroom 106 can revert from powered communications with fuel dispensers 110 and 112 to legacy communications over the legacy cabling. It is to be appreciated that the fuel dispensers can protect legacy interfaces during the power outage to prevent powered communications from reaching associated circuitry. In another example, backroom 106 and fuel dispensers 110 and 112 can communicate using wireless technologies over respective modems. In this example, backroom 106 transmits power signals over legacy cabling in the event of a power outage, and fuel dispensers 110 and 112 can power wireless modems via the signals for wirelessly communicating with backroom 106. In any case, when the power outage subsides, backroom 106 can revert to legacy communication with fuel dispensers 110 and 112 over the legacy cabling. Moreover, communications over the modem of fuel dispensers 110 and 112, whether wired or wireless, can continue when power is restored to provide higher bandwidth than the legacy communications, and the modem can be powered by the power source 104 instead of powered communications from the backroom 106, in this example.

Figure 2:
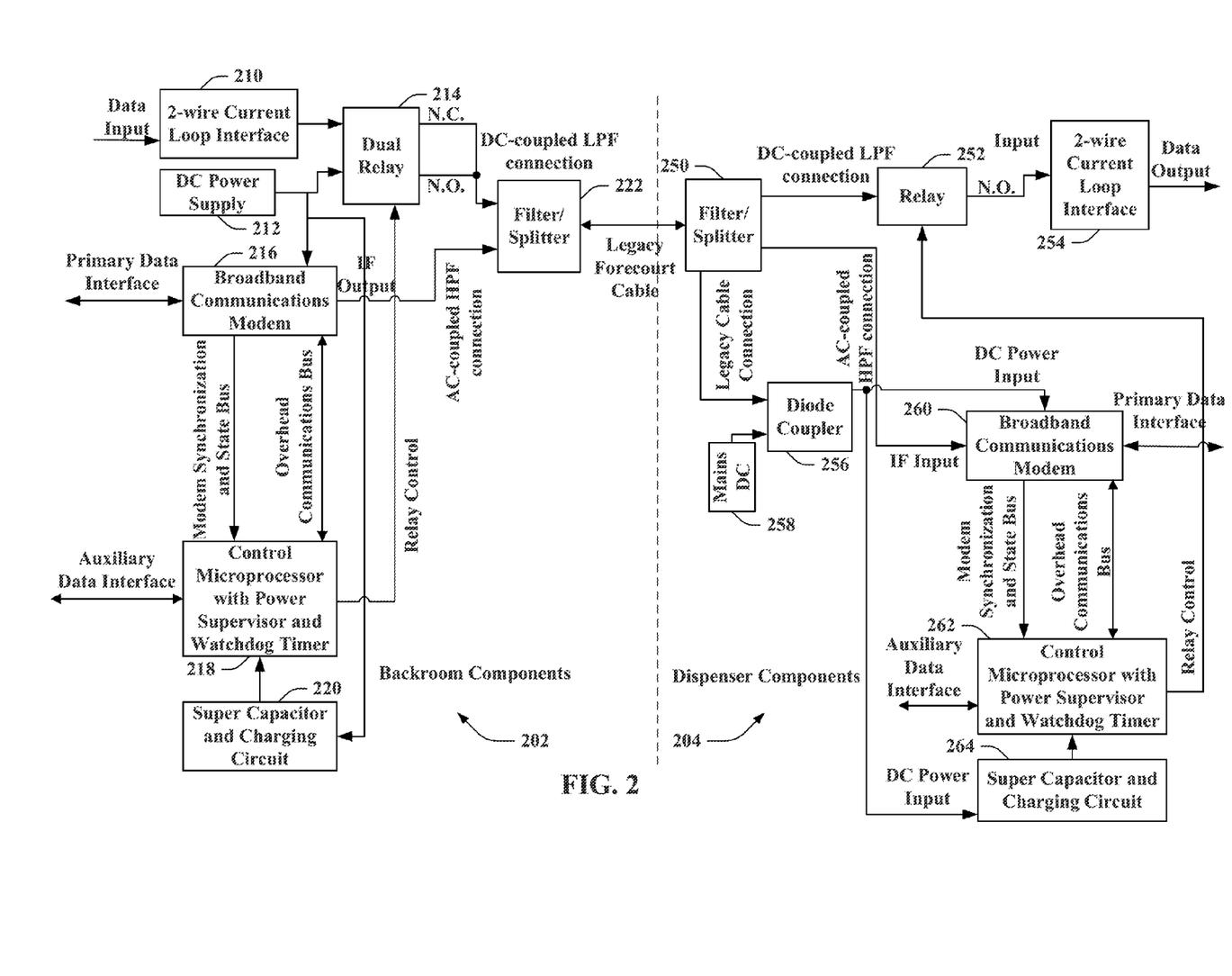
FIG. 2 is an aspect of an example system for switching between powered and legacy communications in a fuel dispensing environment.

FIG. 2 illustrates example backroom components 202 and dispenser components 204 to allow powered communications over legacy cabling, in one example application of the described subject matter at a service station. Backroom components 202 can include a 2-wire current loop interface 210 for managing legacy 2-wire communications, a DC power supply 212 (e.g., a UPS) that can provide DC power in place of 2-wire signals, as described herein, and a dual relay 214 (or other suitable switching mechanism) that can control whether to output the 2-wire communications or the DC power signals based on a control signal. Backroom components 202 also include a broadband communications modem 216 that facilitates communicating with one or more dispensers using a broadband technology, such as digital subscriber line (DSL) or one or more variants thereof, or other high bandwidth transmission protocol, over legacy forecourt cabling. Backroom components 202 can additionally include a control microprocessor with power supervisor and watchdog timer 218 for determining whether to utilize legacy or powered communications in certain scenarios, a super capacitor and charging circuit 220 for providing a level of backup power at the backroom components 202 for a portion of a power outage, and a filter/splitter 222 for combining broadband communications with either power signals or legacy communications over legacy cabling (shown as a legacy forecourt cable).

Dispenser components 204 can be part of a dispenser communication module (DCM), protocol processor module (PPM), etc. within one or more fuel dispensers, and can include a corresponding filter/splitter 250 for separating broadband communications from power signals or legacy communications from a backroom, a relay 252 for passing the 2-wire signal where present, or opening where DC power signals are received from the backroom, so as not to damage the 2-wire current loop interface 254 or related circuitry, for example. A 2-wire current loop interface 254 is provided for processing 2-wire communications into data output. Dispenser components 204 further include a diode coupler 256 for enabling power received from the powered communications and/or from a mains DC 258 power source to power some of the dispenser components 204. Dispenser components 204 also include a broadband communications modem 260 for receiving high-speed communications from broadband communication modem 216 over the legacy cabling, a control microprocessor with power supervisor and watchdog timer 262 for determining whether to close relay 252, and a super capacitor and charging circuit 264 for providing a level of backup power at the dispenser components 204 for a portion of a power outage.

According to an example, relays 214 and 252 enable connection of the 2-wire circuits over legacy cabling when power is sufficiently available, and/or can facilitate powered communications when power is not sufficiently available. For example, when power is on, or at least at a threshold available power, legacy communications from the backroom components 202 to dispenser components 204 can subsist. For example, the 2-wire portion of dual relay 214 is normally closed (N.C.), allowing 2-wire current loop interface 210 output to pass to filter/splitter 222. In this example, the DC power supply portion of dual relay 214 is in a normally open (N.O.) state, and does not allow DC power to pass to filter/splitter 222 in this state. Relay 252 can be normally open (N.O.) to prevent powered communications unexpectedly reaching 2-wire current loop interface 254 in a normal operating state.

Control microprocessors 218 and 262 can respectively operate relays 214 and 252, through control signaling. Thus, when power is sufficiently available, microprocessor 218 does not communicate a control signal to dual relay 214, and microprocessor 262 does communicate a control signal to relay 252 to close the circuit. In this example, dual relay 214 passes legacy communications from 2-wire current loop interface 210 over a DC-coupled low pass filter (LPF) connection between the backroom components 202 and dispenser components 204. In the event of a planned or unplanned power outage, for example, microprocessor 218 can communicate a control signal to relay 214 to cause the legacy communication portion to open, and the DC power supply portion to close, and microprocessor 262 terminates the control signal to relay 252 to prevent DC power signals from passing to the 2-wire current loop interface 254. It is to be appreciated that DC power supply 212 can be used to operate the microprocessor 218 and/or to charge capacitor 220 as well during a power outage, in one example.

In this regard, it is to be appreciated that microprocessors 218 and 262 can control the relays 214 and 252 based in part on communicating with one another. In one example, microprocessors 218 and 262 can communicate using broadband communication modems 216 and 260. Regardless of the state of relays 214 and 252, broadband communications modem 216 can communicate with broadband communications modem 260 via filter/splitters 222 and 250 over legacy cabling therebetween, such as video advertisements or other information, promotional data, critical data, etc. As depicted, broadband communications modems 216 and 260 can establish an AC-coupled high pass filter (HPF) connection to facilitate communicating AC signals without DC current over the legacy cabling. This communication can occur alongside 2-wire communication or power signaling (e.g., as the DC-coupled LPF connection) depending on a state of dual relay 214.

For example, broadband communications modems 216 and 260 can communicate over the legacy cabling using very high digital subscriber line (VDSL), VDSL2, asymmetric digital subscriber line (ADSL), Broadband over Power Line (e.g., HomePlug, HomePlug AV, etc.), time division multiplexing (TDM)/time division multiple access (TDMA), and/or similar technologies. This allows for more bandwidth for communications between the backroom and dispensers than legacy communication protocols. For example, the technology utilized can include state machines for maintaining synchronization states and/or overhead communications between the modems 216 and 260, as described further herein (e.g., "out of sync," "show time," or similar DSL states).

Microprocessors 218 and 262 can leverage this communication to determine whether/when to use legacy and/or powered communications. Where microprocessors 218 and 262 determine to activate legacy communications, for example, microprocessor 262 can communicate a control signal to the dispenser relay 252, which operates N.O., to close the relay 252, thus enabling the 2-wire interface circuit. The power supervisor of the microprocessor 262 can be utilized to ensure this behavior when the link between broadband communications modems 216 and 260 is in a certain state, for example. This can include a "show time" state for digital subscriber link (DSL) technology indicating that the DSL link is active and communication with backroom microprocessor 218 is reliable, in one example, which can be communicated over modem synchronization and state buses, as depicted. In addition, the power supervisor of microprocessor 262 can send the control signal to relay 252 further based on whether microprocessor 262 and microprocessor 218 agree (e.g., via communications over broadband communications modems 216 and 260) that it is safe to switch the relay 252. Other communications technologies have state equivalents to DSL "show time" that can be communicated (e.g., unique word acquisition in TDM/TDMA systems). Moreover, in this example, microprocessor 218 can accordingly terminate a control signal to dual relay 214 to facilitate switching from powered communications to legacy communications. In this regard, the microprocessors 218 and 262 can each have interfaces for DSL (or other broadband communications technology) link status, relay control, power sensing, etc.

In one example, microprocessors 218 and/or 262 can determine that a planned or unplanned power outage has occurred, and can communicate over the broadband communications link to determine to switch to powered communications. For instance, the backroom components 202 can have switched to power by super capacitor 220, and the dispenser components can have switched to power by super capacitor 264. This can allow the microprocessors to communicate for at least a period of time during the power outage. In one example, after a period of time of being powered by the capacitors, the microprocessors 218 and 262 can determine to switch to powered communications, which can include one of the microprocessors making the decisions and communicating to the other, expiration of a related timer at both microprocessors 218 and 262, etc. In another example, microprocessor 262 can determine that power is lost or that the link to the backroom via broadband communications modem 216 is down. In any case, microprocessor 262 can terminate the control signal to relay 252 (or otherwise the microprocessor 262 loses power as well causing termination of the control signal), which causes the relay to open and not pass the signals to 2-wire control loop interface 254. This can safeguard the 2-wire control loop interface 254 from powered communications, as the signals may be powered due to microprocessor 218 also detecting the power outage and communicating a control signal to dual relay 214 to facilitate powered communications.

It is to be appreciated that though the microprocessors 218 and 262 can perform processes to determine whether to switch to powered communications using steps described above, other processes are possible as well. For example, microprocessors 218 and 262 can utilize processes defined based on other equipment installed at the site, as described in further detail below (e.g., site wiring, whether there is a common AC mains power source, etc.) to determine whether and/or how to switch to powered communications in the event of an outage.

Filter/splitter 250 passes received signals, or at least a DC-coupled LPF component thereof, to diode coupler 256. Thus, where the signals are powered communications, the diode coupler 256 can use the received DC power portion of signals to power broadband communications modem 260 (e.g., and microprocessor 262 and capacitor 264 as well) for receiving the AC-coupled HPF portion of the signal from filter/splitter 250.

Once power is restored, or is at least at a threshold level, diode coupler 256 allows for power from mains DC 258, which can be converted AC power from a power source, to power broadband communications modem 260. It is to be appreciated that the diode coupler 256 could be replaced with a relay if circuit design constraints require, in which case processor 262 can control the relay. In addition, when power is restored, microprocessors 218 and 262 can communicate via broadband link communications to determine when to activate legacy communications. For example, microprocessors 218 and 262 can wait for a "show time" status for the broadband link. When this occurs, for example, microprocessor 218 can terminate the control signal to relay 214, and microprocessor 262 can communicate a control signal to relay 252, which refrains from powered communications at the relay 214, and allows 2-wire communications over the legacy cabling, as described.

Moreover, to provide failsafe protection for the 2-wire circuits, which can include or communicate via 2-wire current loop interface 254, the watchdog timer at microprocessor 262 can disconnect the 2-wire interface (e.g., by terminating the control signal to relay 252) if the dispenser microprocessor 262 malfunctions. Similarly, the watchdog timer of the backroom microprocessor 218 can refrain from enabling coupling of DC power to the legacy cable interface via dual relay 214 (e.g., by terminating a control signal to relay 214, leaving a portion related to DC power supply 212 in an open state) if microprocessor 218 malfunctions. Either watchdog timer event can require replacement of the defective microprocessor before normal function continues; however, redundant processors (not shown) can be provided for added reliability, in another example. Furthermore, to prevent switching glitches at power on or off instants, it is apparent that the unpowered ("normal") state of the dispenser relay 252 can be N.O., such to render 2-wire current loop interface 254 normally disconnected, while the normal state of the backroom relay 214 is N.O. for the DC power supply 212 portion, such to render DC power supply 212 as normally disconnected, as described above.

Furthermore, different behaviors for power outages of various lengths can be defined, if desired, and/or can be site specific. For example, the microprocessors 218 and 262 can each utilize a super capacitor 220 or 264, respectively, that enables running timers in the backroom and dispensers, for example, to inhibit switching to powered communications during short power outages, and/or to store data regarding past and current link states. A super capacitor can be utilized to avoid life expectancy and temperature range problems with batteries. The super capacitor can typically hold up processor power for times longer than typical short-term power outages of less than 1 minute. Following expiration of a time, however, microprocessors 218 and 262 can determine to switch to powered communications, as described.

For example, operation of the broadband communication link can be critical for enabling of 2-wire circuits, as the backroom can surmise the dispenser power state by link status. An "out of sync" status (e.g., in DSL), or a status other than "show time," for a time longer than short-term power outages that can be handled by the super capacitors 220 and 264 can be detected by the microprocessors 218 and 262, and used to enable powered communication over the legacy cabling, as described. For example, the microprocessors 218 and 262 can both detect the time of the status, one of the microprocessors 218 or 262 can detect the time and notify the other over the broadband link, etc. Similarly, where microprocessors 218 and/or 262 detect a certain mode for the broadband link (e.g., "show time" mode for DSL) before expiration of the time (or before the threshold capacity is reached by capacitor 220 and/or 264), the appropriate control signals can be sent to or terminated from respective relay 214 or 252. Thus, the capacitors 220 and 264 can be a first measure to handle a power outage, and the microprocessors 218 and 262 can communicate to move to powered communications if power has not returned after the specified time.

Further, site-specific options can be configured as well. For example, a common AC mains power source can be assumed for the backroom and dispensers to optimize the decision time for enabling the DC power supply in the backroom in the event of a power outage. In one example, this option can be enabled based on actual site wiring implementation. Other parameters, such as time lengths for performing switch of relay 214 and/or 252 can also be programmable. External elements to the system, such as point-of-sale terminals, forecourt controllers, etc., can be utilized to configure, monitor and control the system, set various thresholds or constraints for detecting power outage, switching to powered communications, etc. In one example, such components can communicate with the system by a remote connection to one or more of broadband communications modems 216 or 260, or other connections thereto, and microprocessors 218 and 262 can accordingly generate control signals to the relays 214 and 252 based on commands from the components.

In addition, in one example, a DSL out of band signaling channel of broadband communications modem 216 and/or 260 can be used for relay and 2-wire isolation state control if necessary, or in lieu of use of the modem synchronization and control bus depending on modem technology. Thus, in this example, broadband communications modem 216 and/or 260 can send the control signal to relay 214 or 252 over the out of band signaling channel (e.g., once the "show time" state is detected). Moreover, it is to be appreciated that the concepts described herein can be used with substantially any system for powering communications over at least a portion of legacy cabling. In one example, embodiments of the present invention may be utilized in non-dispenser applications, such as tank farms, or other remote applications not needing AC mains power. In such examples, the system can use constantly powered communications (e.g., DSL powered as described) over legacy cabling.

Moreover, data interfaces are depicted as well, such as 2-wire data input to 2-wire current loop interface 210 and output from 2-wire current loop interface 254, a broadband "Primary Data Interface" and "Auxiliary Data Interface" as noted in FIG. 2. The "Primary Data Interface" can correlate to an interface for allowing applications at the backroom to communicate with applications at the dispensers. The "Auxiliary Data Interface" is shown connecting to microprocessors 218 and 262, and can include one or more low data rate interfaces, such as RS-232 serial ports, for defining behavior of microprocessors 218 and 262 in certain scenarios and/or to otherwise operate the microprocessors 218 and 262. The microprocessors 218 and 262 have access to the "overhead communications bus" to the modems 216 and 260, respectively, as shown. Various modem technologies can provide overhead data channel or signaling data channel interfaces, which can be used for low data rate Telco applications such as indicating line or equipment state. In an example, however, the overhead channel can be utilized as a generic low rate data interface. For example, the microprocessors 218 and 262 provide appropriate multiplexing of auxiliary data interfaces to the overhead communications bus. This can facilitate processes to conserve power, as described herein. The interfaces can be physical interfaces, such as physical ports for connecting cabling, graphical user interfaces (GUI), application programming interfaces (API), etc.

It is to be appreciated that the amount of power that can be sent over the legacy cabling is a function of cable length and wire gauge, and in some cases can be limited, for example, to meet "intrinsic safety" requirements. Because the power may be limited, the dispenser components 204 can exist on a single printed wiring board, where the auxiliary data interfaces connect directly to sensors or other equipment that generate critical data. This allows mission critical systems to operate independent of the "Primary Data Interfaces" of the modems 216 and 260, which are typically an Ethernet, USB or other high bandwidth data interface. The power budget can be evaluated for various applications to determine if this feature is needed, otherwise, additional electronics can be powered, for example, devices connected to the primary data interface.

Though not shown, it is to be appreciated that the backroom can employ multiple modems 216, in one example. For instance, the modem 216, 2-wire current loop interface 210, dual relay 214, and filter/splitter 222 can be replicated for each dispenser on the forecourt. The "Modem Synchronization and State Bus" and "Overhead Communications Bus" can then extend between the control microprocessor 218 and all modems 216 in the backroom.

Figure 3:
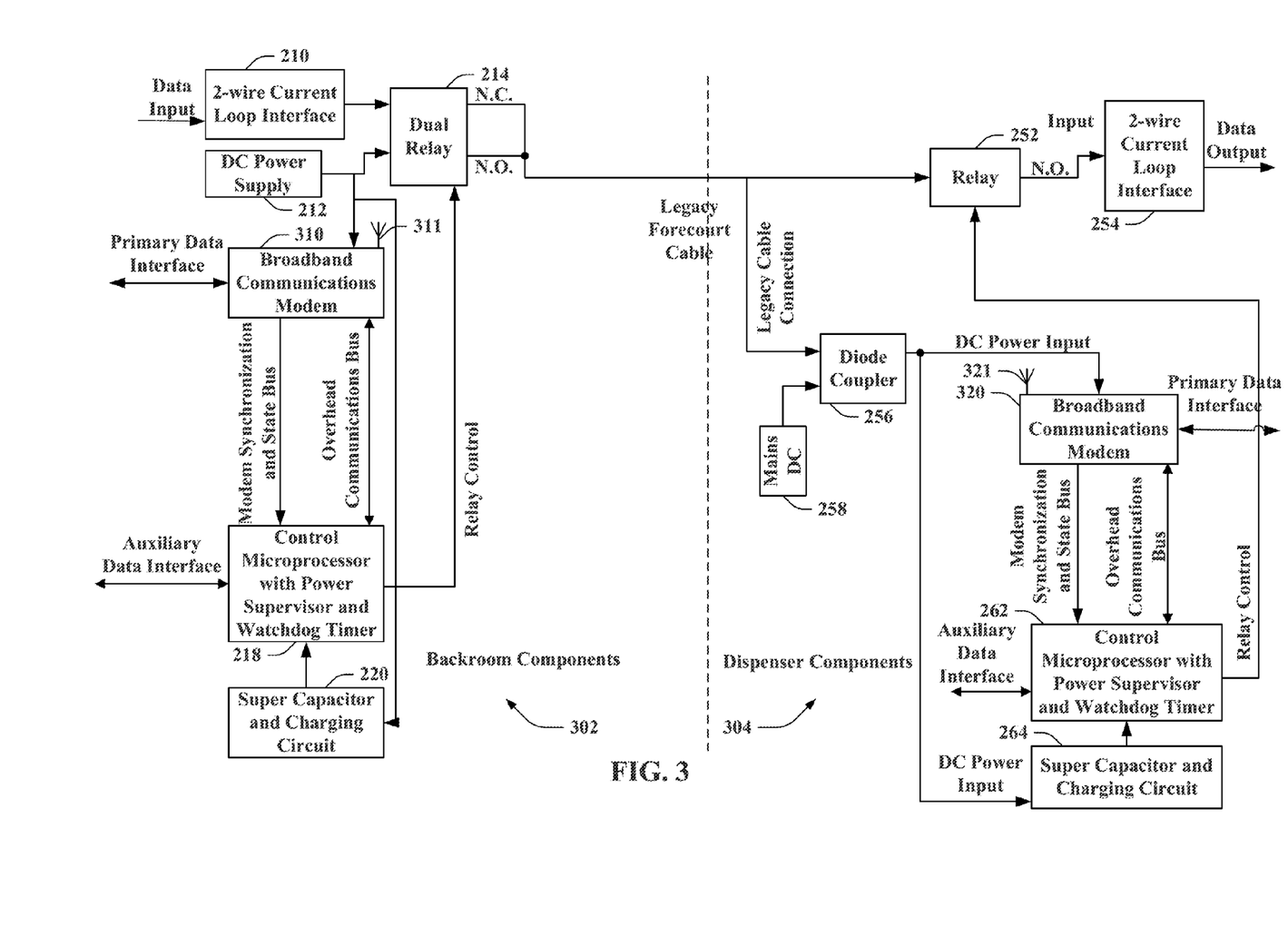
FIG. 3 is an aspect of an example system for switching between powered and legacy communications in a fuel dispensing environment that utilizes wireless broadband connections to communicate data.

FIG. 3 illustrates example backroom components 302 and dispenser components 304 to allow powered communications over legacy cabling in another example. Backroom components 302 can be substantially similar to backroom components 202 of FIG. 2, and dispenser components 304 can be substantially similar to dispenser components 204 of FIG. 2. In this example, however, backroom components 302 include a wireless broadband communications modem 310, and dispenser components 304 include a wireless broadband communications modem 320 for communicating data between a backroom and one or more dispensers. Broadband communications modems 310 and 320 can include respective antennas 311 and 321 to effectuate wireless communications therebetween.

According to an example, broadband communications modems 310 and 320 can establish a radio frequency (RF) connection using various wireless technologies (e.g., WiFi, cellular technologies, Bluetooth, ZigBee, etc.), and can communicate directly and/or via one or more intermediate nodes (e.g., a network switch, a router, the Internet, a mobile network, etc.). The components 302 and 304 operate similarly as in FIG. 2 except that high speed communications need not occur over legacy cabling because the modems 310 and 320 communicate wirelessly. Thus, in the event of a power outage or other power limitation, the backroom can provide power signals from DC power supply 212 to the dispenser by activating a control signal to dual relay 214 causing the 2-wire current loop interface portion of the relay 214 to open, and the DC power supply portion to close. Diode coupler 256 receives the DC power signal, and powers broadband communications modem 320 for communicating with broadband communications modem 310 (over the wireless connection), microprocessor 262 and/or capacitor 264.

As described, the power outage (or signals from microprocessor 218) can cause microprocessor 262 to terminate a control signal to relay 252, which is normally open, causing the relay 252 to open and not forward the DC power signals to 2-wire current loop interface 254. When power is restored, and diode coupler 256 can use mains DC 258 power to power the modem 320, microprocessor 262, and/or capacitor 264, microprocessors 218 and 262 can communicate to determine when to reactivate the control signals to relays 214 and 252, as described, to facilitate 2-wire communications over the legacy cabling.

Figure 4:
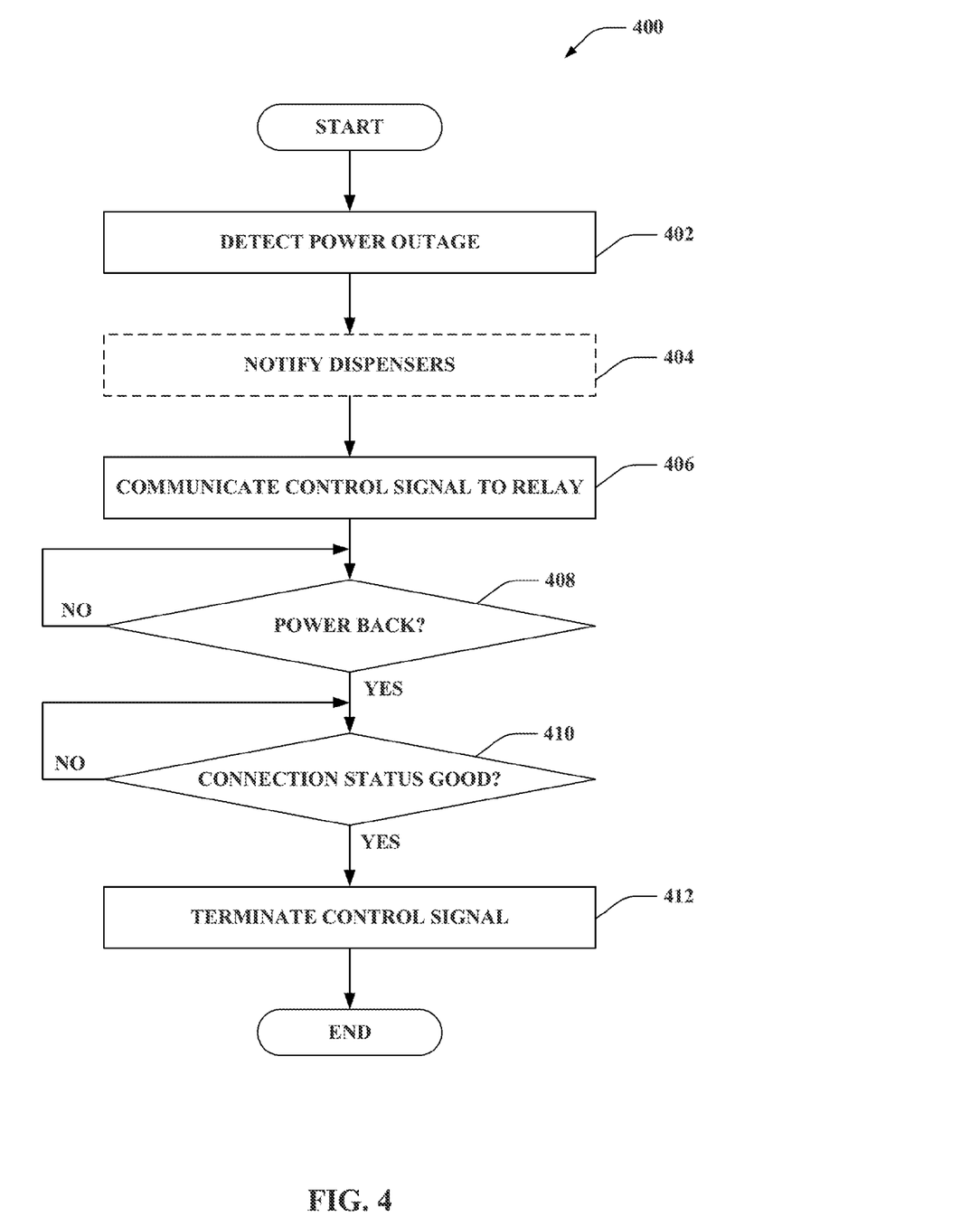
FIG. 4 is an aspect of an example methodology for controlling a relay at a backroom to facilitate switching between powered and legacy communications.
Figure 5:
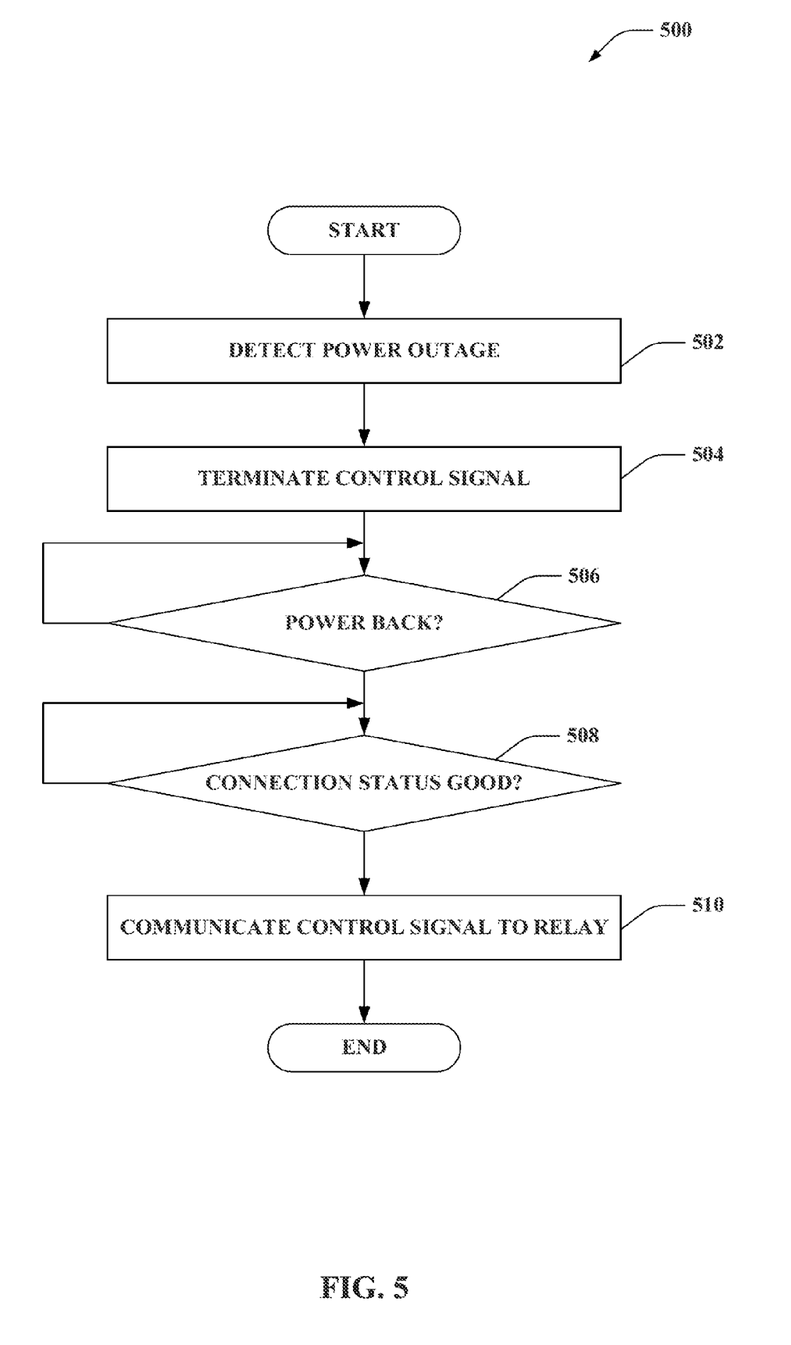
FIG. 5 is an aspect of an example methodology for controlling a relay at a fuel dispenser to avoid sending powered communications to a legacy interface.

Referring to FIGS. 4-5, methodologies that can be utilized in accordance with various aspects described herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 4 illustrates an example methodology 400 performed by a microprocessor for operating one or more backroom components described above. At 402, a power outage can be detected. For example, this can include a local determination that power is not available, a detected or indicated switch to powering by a super capacitor, a notification from the power source, an inference based on an inability to communicate with one or more fuel dispensers, etc.

At 404, dispensers can be optionally notified of the power outage. For example, this can include communicating a notification to the dispensers over a broadband communications link where the dispensers are able to switch to alternate power for at least a portion of the power outage (e.g., using a super capacitor). In one example, the notification can cause the dispensers to open a relay connected to a legacy interface for ceasing signal passage thereto based on the power outage.

At 406, a control signal can be communicated to a relay based on the power outage. The control signal, for example, can cause the relay to open a portion of the relay related to a legacy interface and close a portion of the relay related to signals received from a power supply to facilitate powered communications, as described herein.

At 408, it can be determined whether power has returned from the power outage. This can be detected, for example, based on a local determination of receiving power, a detected or indicated switch from the super capacitor (or an indication that the capacitor is charging), a notification from the power source, etc. If power has not returned, it can be continually checked until it does. This can be an event-driven determination as well, in one example.

If power has returned, at 410, a connection status over a broadband link with one or more dispensers can be determined. If the connection status is good at 410 (e.g., "show time" status for DSL), the control signal is terminated at 412, which can cause the relay to close the legacy interface portion, and open the DC power supply portion to allow legacy communications to pass. If the connection status is not good or is in another defined state, the status can be continually checked until it reaches the desired state, for example.

FIG. 5 illustrates an example methodology 500 for a microprocessor operating a dispenser, as described herein. At 502, a power outage can be detected. For example, this can include a local determination that power is not available, a detected or indicated switch to powering by a super capacitor, a notification from the power source, a notification from a backroom, etc.

At 504, a control signal to a relay can be terminated. For example, the control signal can cause the relay to close and pass signals to a legacy interface; thus, terminating the control signal, which can cause the relay to not pass signals to the legacy interface. This can allow for passing power over legacy cabling without damaging the legacy interface.

At 506, it can be determined whether power has returned. For example, this can include a local determination that power is available, a detected or indicated switch from powering by a super capacitor (or an indication that the capacitor is charging), a notification from the power source, a notification from a backroom, etc. If the power has not returned, it can be continually checked or otherwise be an event-driven determination.

If power has returned, at 508, a connection status over a broadband link with the backroom can be determined. If the connection status is good at 508 (e.g., "show time" status for DSL), the control signal is communicated to the relay at 510, which can cause the relay to close the legacy interface portion to allow legacy communications to pass. If the connection status is not good or is in another defined state, the status can be continually checked until it reaches the desired state, for example.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise random access memory (RAM), read-only memory (ROM), electrically erasable programmable ROM (EEPROM), compact disc (CD)-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While one or more aspects have been described above, it should be understood that any and all equivalent realizations of the presented aspects are included within the scope and spirit thereof. The aspects depicted are presented by way of example only and are not intended as limitations upon the various aspects that can be implemented in view of the descriptions. Thus, it should be understood by those of ordinary skill in this art that the presented subject matter is not limited to these aspects since modifications can be made. Therefore, it is contemplated that any and all such embodiments are included in the presented subject matter as may fall within the scope and spirit thereof.

What is claimed is:

1. A system incorporated into a fuel dispenser for controlling the fuel dispenser and operatively connected to one or more backroom components via legacy cabling, the system comprising:

a coupler communicatively coupled to the legacy cabling for receiving powered communications from the one or more backroom components over the legacy cabling during a power outage;

a broadband communications modem for communicating with the one or more backroom components, wherein the coupler provides power from the powered communications to the broadband communications modem during the power outage but is otherwise powered by a mains power source at the fuel dispenser; and a legacy interface connected to the legacy cabling for legacy communications when the powered communications over the legacy cabling is not occurring, wherein the legacy interface is disconnected from the legacy cabling when the powered communications over the legacy cabling is occurring.

2. The system of claim 1, further comprising:

a relay for passing signals received over the legacy cabling to the legacy interface when the relay is closed; and a microprocessor for generating a control signal that causes the relay to close when sufficient power is available to facilitate the legacy communications over the legacy cabling.

3. The system of claim 2, wherein the microprocessor terminates the control signal during at least a portion of the power outage to cause the relay to open.

4. The system of claim 3, wherein the portion of the power outage correlates to receiving the powered communications over the legacy cabling.

5. The system of claim 3, wherein the microprocessor determines to terminate the control signal based at least in part on detecting the power outage.

6. The system of claim 5, wherein the microprocessor detects the power outage based at least in part on receiving an indication of the power outage from a microprocessor of the one or more backroom components via the broadband communications modem.

7. The system of claim 5, wherein the microprocessor detects the power outage based at least in part on detecting a switch from receiving power from a coupler to receiving power from a super capacitor for at least a period of time.

8. The system of claim 3, wherein the power outage disrupts power to the microprocessor causing termination of the control signal.

9. The system of claim 2, wherein the microprocessor generates the control signal based on communications with one or more microprocessors of the one or more backroom components.

10. The system of claim 9, wherein the communications include a determined state of a connection between the broadband communications modem and a backroom broadband communications modem of the backroom components.

11. The system of claim 2, wherein the microprocessor generates the control signal based at least in part on one or more components installed at a site of the fuel dispenser.

12. The system of claim 11, wherein the one or more components correspond to wiring or power sources at the site.

13. The system of claim 2, wherein the microprocessor generates the control signal based at least in part on instructions received from a point-of-sale terminal or a forecourt controller remotely located from the fuel dispenser.

14. The system of claim 1, wherein the broadband communications modem is a wireless modem that wirelessly communicates with a backroom broadband communications modem.

* * * * *